United States Patent
Kiyokami et al.

(10) Patent No.: US 10,622,869 B2
(45) Date of Patent: Apr. 14, 2020

(54) COOLING SYSTEM FOR VEHICLE ROTARY ELECTRIC MACHINE

(71) Applicant: TOYOTA JIDOSHA KABUSHIKI KAISHA, Toyota-shi, Aichi (JP)

(72) Inventors: Hiroaki Kiyokami, Toyota (JP); Kazuki Iwakura, Toyota (JP); Hakuba Okuno, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 16/116,096

(22) Filed: Aug. 29, 2018

(65) Prior Publication Data

US 2019/0081537 A1 Mar. 14, 2019

(30) Foreign Application Priority Data

Sep. 8, 2017 (JP) .................. 2017-173569

(51) Int. Cl.
| | |
|---|---|
| *H02K 9/19* | (2006.01) |
| *B60K 6/26* | (2007.10) |
| *H02K 7/116* | (2006.01) |
| *H02K 7/00* | (2006.01) |
| *F16H 57/04* | (2010.01) |
| *B60K 6/40* | (2007.10) |
| *B60K 6/445* | (2007.10) |

(52) U.S. Cl.
CPC .................. *H02K 9/19* (2013.01); *B60K 6/26* (2013.01); *B60K 6/40* (2013.01); *B60K 6/445* (2013.01); *F16H 57/043* (2013.01); *F16H 57/0441* (2013.01); *F16H 57/0476* (2013.01); *H02K 7/006* (2013.01); *H02K 7/116* (2013.01); *B60Y 2200/92* (2013.01); *B60Y 2306/05* (2013.01)

(58) Field of Classification Search
CPC .......... H02K 9/19; H02K 7/116; H02K 7/006; B60K 6/26
USPC .................. 310/52, 54, 58, 59, 60 R, 61, 64
See application file for complete search history.

(56) References Cited

U.S. PATENT DOCUMENTS

| | | | | |
|---|---|---|---|---|
| 5,196,746 A | * | 3/1993 | McCabria | B64D 41/00 310/54 |
| 5,509,381 A | * | 4/1996 | Fisher | F01M 9/108 123/196 R |

(Continued)

FOREIGN PATENT DOCUMENTS

| | | |
|---|---|---|
| JP | 2009-118686 A | 5/2009 |
| JP | 2012-106599 A | 6/2012 |

(Continued)

Primary Examiner — Hanh N Nguyen
(74) Attorney, Agent, or Firm — Oliff PLC

(57) ABSTRACT

A cooling system for a rotary electric machine which is provided in a vehicle for driving the vehicle. The cooling system includes: a first pump which is to be mechanically driven accompanying with running of the vehicle, to supply lubricant to the rotary electric machine; and a second pump which is to be driven by a second drive source that is other than a first drive source of the first pump, to supply the lubricant to the rotary electric machine. The first pump is configured to supply the lubricant, through a first passage, to an inside of a rotary shaft of a rotor core of the rotary electric machine. The second pump is configured to supply the lubricant, through a second passage, to a coil of a stator of the rotary electric machine.

7 Claims, 9 Drawing Sheets

(56) References Cited

U.S. PATENT DOCUMENTS

| | | | | |
|---|---|---|---|---|
| 2013/0038151 A1* | 2/2013 | Ohashi | ............... | H02K 1/32 310/59 |
| 2013/0334912 A1* | 12/2013 | Tokunaga | ............ | H02K 9/19 310/54 |
| 2014/0125165 A1* | 5/2014 | Miyamoto | .......... | H02K 1/32 310/54 |
| 2015/0295473 A1* | 10/2015 | Suzuki | ............... | H02K 9/19 310/54 |
| 2018/0045090 A1 | 2/2018 | Kiyokami et al. | | |
| 2018/0205294 A1 | 7/2018 | Manabe et al. | | |

FOREIGN PATENT DOCUMENTS

| | | |
|---|---|---|
| JP | 2017-052335 A | 3/2017 |
| JP | 2017-136964 A | 8/2017 |
| WO | 2017/018067 A1 | 2/2017 |

* cited by examiner

| RUNNING MODE | ENGINE 20 | MG1 | MG2 | P1 | P2 |
|---|---|---|---|---|---|
| EV RUNNING | STOPPED | FREE | POWER RUNNING | OPERATED | STOPPED |
| HV RUNNING | OPERATED | REGENERATING | FREE OR POWER RUNNING | OPERATED | OPERATED |

COOLING SYSTEM FOR VEHICLE ROTARY ELECTRIC MACHINE

This application claims priority from Japanese Patent Application No. 2017-173569 filed on Sep. 8, 2017, the disclosure of which is herein incorporated by reference in its entirety.

FIELD OF THE INVENTION

The present invention relates to a cooling system for cooling a rotary electric machine that is provided in a vehicle for driving the vehicle, by supplying lubricant to the rotary electric machine.

BACKGROUND OF THE INVENTION

There is proposed a cooling system for a hybrid vehicle that includes an engine, a rotary electric machine and a power transmission device configured to transmit a driving force of each of the engine and the rotary electric machine to drive wheels of the vehicle through an output portion of the power transmission device, wherein the cooling system includes a first pump that is to be mechanically driven by rotation of the output portion and a second pump that is to be mechanically driven by rotation of the engine. In the proposed cooling system, when being driven, each of the first and second pumps ejects lubricant that is supplied to the rotary electric machine, for thereby cooling the rotary electric machine. For restraining increase of temperature of the rotary electric machine, an amount of the lubricant supplied to the rotary electric machine needs to be increased, particularly, where there is a need to widen a range of a vehicle running speed in which the vehicle is caused to run by the rotary electric machine with the engine being stopped. A cooling system, which is disclosed in JP2012-106599A, is an example of this type of the cooling system. In the cooling system disclosed in this document, the rotary electric machine is cooled such that an amount of the lubricant supplied from the first pump to the rotary electric machine, which is mechanically driven by rotation of the output portion of the power transmission device corresponding to the vehicle running speed, is increased with increase of the vehicle running speed, namely, with increase of an amount of heat generation by the rotary element machine.

SUMMARY OF THE INVENTION

By the way, there is a risk that the rotary electric machine could not be sufficiently cooled by only the arrangement in which the amount of the lubricant supplied from each of the first and second pumps is changed merely depending on the amount of heat generation by the rotary electric machine. The present inventors and their collaborators found out that a part of the rotary electric machine in which the heat is generated are changed depending on a magnitude of an output torque of the rotary electric machine and a value of a rotating speed of the rotary electric machine. For example, when the rotating speed is low with the output torque being high, an electric current flowing through a stator coil of the rotary electric machine is increased whereby the heat generated in the coil is increased. When the rotating speed is high, an eddy current generated in a rotor core of the rotary electric machine is increased whereby the heat generated in the rotor core is increased. Thus, the present inventors and their collaborators found out that the rotary electric machine can be cooled with an increased efficiency, by appropriately changing a lubricant supplied part of the rotary electric machine, depending on the magnitude of the output torque and the value of the rotating speed of the rotary electric machine.

The present invention was made in view of the background art described above. It is therefore an object of the present invention to provide a cooling system capable of appropriately cooling a rotary electric machine provided in a vehicle, depending on changes of an output torque and a rotating speed of the rotary electric machine.

The object indicated above is achieved according to the following aspects of the present invention.

According to a first aspect of the invention, there is provided a cooling system for a rotary electric machine which is provided in a vehicle for driving the vehicle. The cooling system includes: a first pump which is to be mechanically driven accompanying with running of the vehicle, to supply lubricant to the rotary electric machine; and a second pump which is to be driven by a second drive source that is other than a first drive source of the first pump, to supply the lubricant to the rotary electric machine. The first pump is configured to supply the lubricant, through a first passage, to an inside of a rotary shaft of a rotor core of the rotary electric machine. The second pump is configured to supply the lubricant, through a second passage, to a coil of a stator of the rotary electric machine.

According to a second aspect of the invention, in the cooling system according to the first aspect of the invention, the vehicle includes a power transmission device configured to transmit a drive force for driving drive wheels of the vehicle, the power transmission device includes an output portion through which the drive force is outputted from the power transmission device, and the first pump is an oil pump that is to be mechanically driven by the first drive source that is constituted by the output portion configured to rotate drive shafts of respective drive wheels of the vehicle.

According to a third aspect of the invention, in the cooling system according to the first or second aspect of the invention, the second pump is an oil pump that is to be mechanically driven by an engine of the vehicle as the second drive source.

According to a fourth aspect of the invention, in the cooling system according to any one of the first through third aspects of the invention, the second passage, through which the lubricant is to be supplied from the second pump to the coil of the stator of the rotary electric machine, is provided with a heat exchanger, while the first passage is provided without a heat exchanger.

According to a fifth aspect of the invention, in the cooling system according to any one of the first through fourth aspects of the invention, the first passage includes a lubricant hole that communicates between the inside of the rotary shaft and an internal portion of the rotor core, such that the lubricant supplied to the inside of the rotary shaft is caused to flow from the inside of the rotary shaft to the internal portion of the rotor core via the lubricant hole.

According to a sixth aspect of the invention, in the cooling system according to the first aspect of the invention, the first pump is configured to supply the lubricant through the first passage to a gear train portion connected to an output portion that is configured to rotate drive shafts of respective drive wheels of the vehicle.

According to a seventh aspect of the invention, in the cooling system according to any one of the first, second and fourth through sixth aspects of the invention, the second pump is an oil pump that is to be mechanically driven by an electric motor as the second drive source.

The cooling system according to the first aspect of the invention includes: the first pump which is to be mechanically driven accompanying with running of the vehicle, to supply lubricant to the rotary electric machine, and the second pump which is to be driven by the second drive source that is other than the first drive source of the first pump, to supply the lubricant to the rotary electric machine, wherein the first pump is configured to supply the lubricant, through the first passage, to the inside of the rotary shaft of the rotor core of the rotary electric machine, and the second pump is configured to supply the lubricant, through the second passage, to the coil of the stator of the rotary electric machine. Thus, an amount of the lubricant supplied from each of the first and second pumps can be controlled appropriately depending on change of a heat generation part of the rotary electric machine in which heat is generated.

In the cooling system according to the second aspect of the invention, the first pump is an oil pump that is to be mechanically driven by the output portion configured to rotate the drive shafts of the respective drive wheels of the vehicle. Thus, when a running speed of the vehicle is high, namely, when heat generated in the rotor core of the rotary electric machine is increased with increase of a rotating speed of the rotor core, an amount of the lubricant supplied to the inside of the rotary shaft of the rotor core is increased whereby the heat generation part of the rotary electric machine can be appropriately cooled.

In the cooling system according to the third aspect of the invention, the second pump is an oil pump that is to be mechanically driven by an engine of the vehicle as the second drive source. Thus, when the running speed of the vehicle is low with a required output torque of the rotary electric machine being high, namely, when an amount of heat generated in the coil of the stator of the rotary electric machine is increased, the lubricant is supplied to the coil of the stator whereby the heat generation part of the rotary electric machine can be appropriately cooled.

In the cooling system according to the fourth aspect of the invention, the second passage, through which the lubricant is to be supplied from the second pump to the coil of the stator of the rotary electric machine, is provided with a heat exchanger, and the first passage is provided without a heat exchanger. Thus, when the lubricant is supplied through the first passage from the first pump that is mechanically driven accompanying with running of the vehicle, with the supply of the lubricant from the second pump being stopped, at a low temperature at which a viscosity of the lubricant is high, a mechanical loss that could be caused due to the high viscosity of the lubricant can be restrained owing to the arrangement in which the first passage is provided without the heat exchanger whereby the lubricant is rapidly warmed.

In the cooling system according to the fifth aspect of the invention, the first passage includes a lubricant hole that communicates between the inside of the rotary shaft and the internal portion of the rotor core, such that the lubricant supplied to the inside of the rotary shaft is caused to flow from the inside of the rotary shaft to the internal portion of the rotor core. Thus, the lubricant supplied by operation of the first pump is caused to flow into the internal portion of the rotor core of the rotary electric machine, whereby the cooling of the rotor core is more effectively made.

In the cooling system according to the sixth aspect of the invention, the first pump is configured to supply the lubricant through the first passage to the gear train portion of the power transmission device as well as to the inside of the rotary shaft of the rotor core of the rotary electric machine. Thus, the cooling of the rotary electric machine and the lubrication of the gear train portion can be made by a single pump, whereby the vehicle can be made compact in size.

In the cooling system according to the seventh aspect of the invention, the second pump is an oil pump that is to be mechanically driven by an electric motor as the second drive source. Thus, when the vehicle running speed is high, namely, when an amount of the heat generation in the rotor core is increased with increase of the rotating speed of the rotor core of the rotary electric machine, the amount of supply of the lubricant into the inside of the rotary shaft of the rotor core is increased whereby the heat generation part of the rotary electric machine can be appropriately cooled.

DETAILED DESCRIPTION OF PREFERRED EMBODIMENTS

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

First Embodiment

Figure 1:
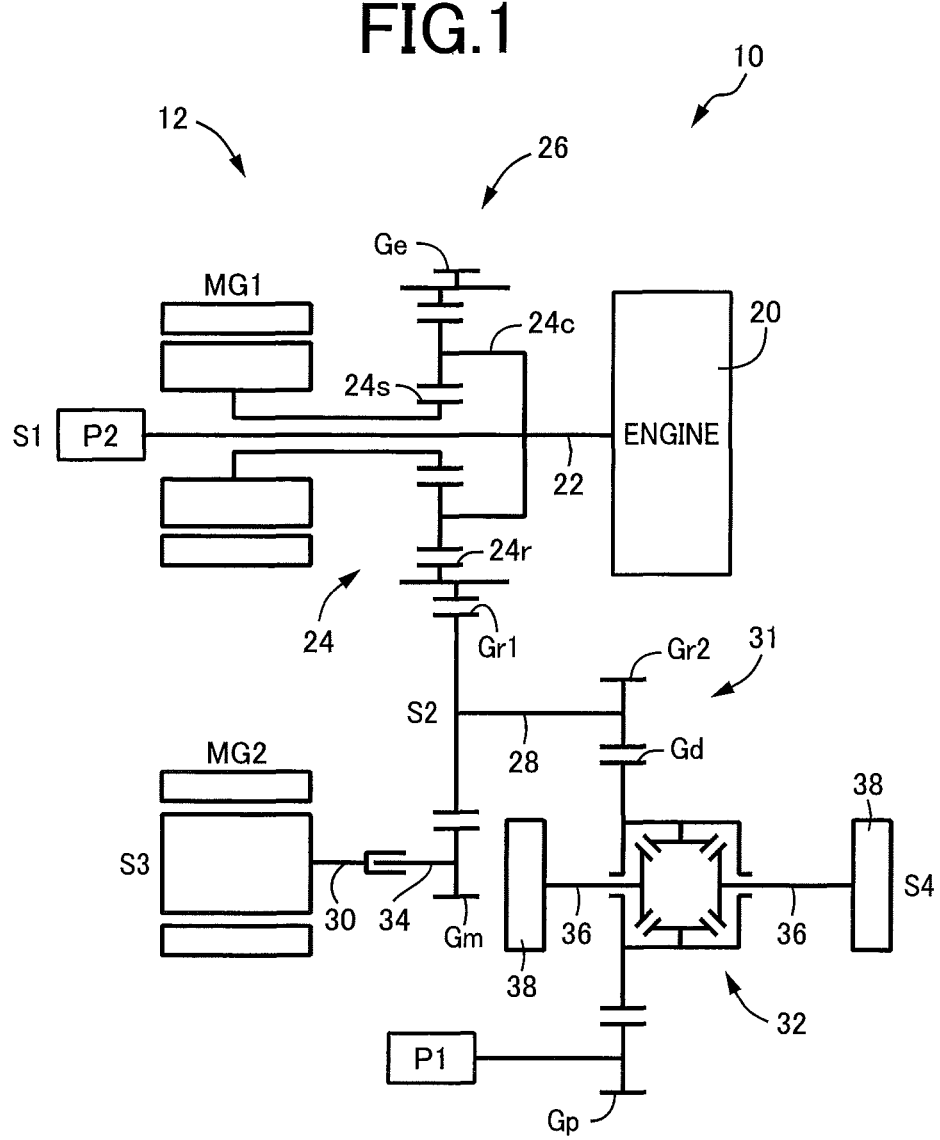
FIG. 1 is a schematic view showing a power transmission device of a hybrid vehicle to which the present invention is advantageously applied.
Figure 2:
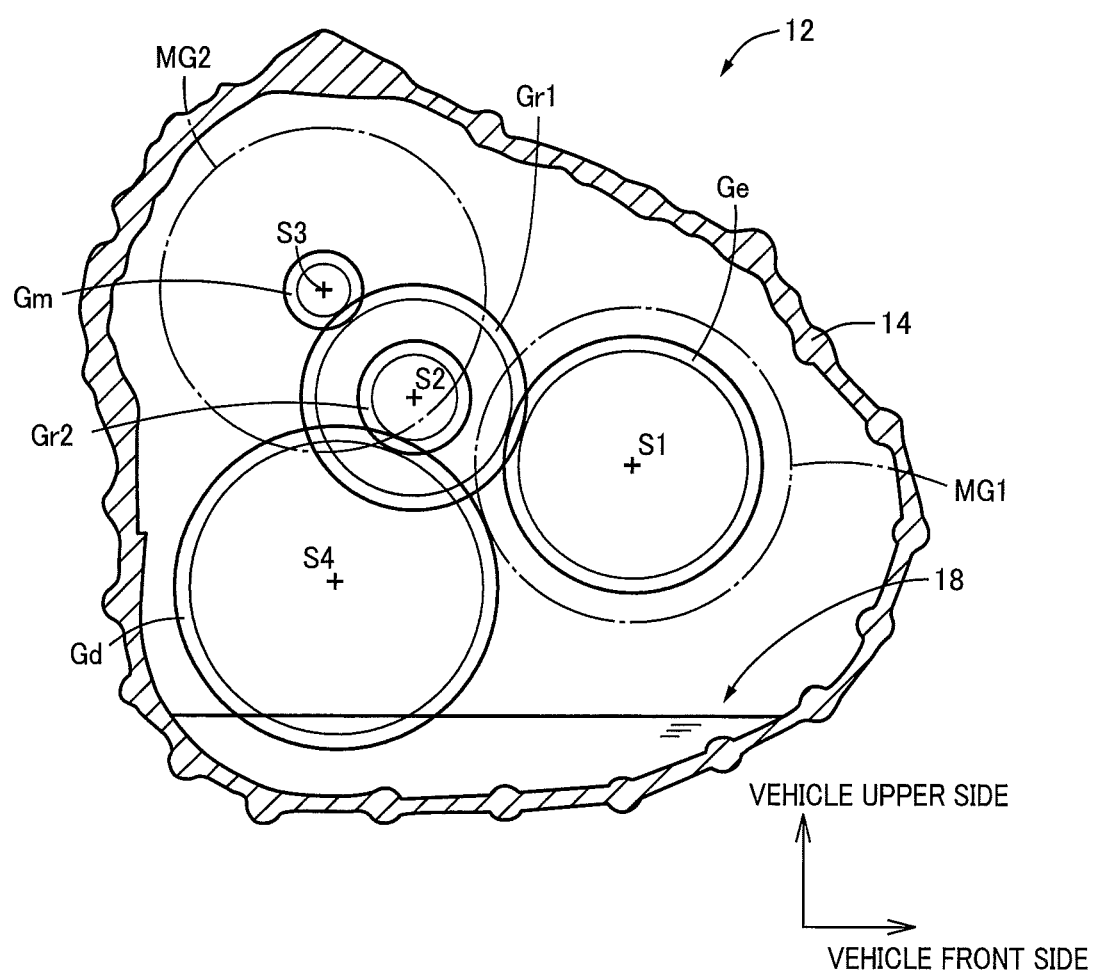
FIG. 2 is a cross sectional view showing a positional relationship among a plurality of axes of the power transmission device shown in FIG. 1.

FIG. 1 is a schematic view showing a power transmission device 12 of a hybrid vehicle 10 to which the present invention is advantageously applied. The view of FIG. 1 is a development view illustrating the power transmission device 12 in a manner in which a plurality of axes of the power transmission device 12 are contained in a single plane. FIG. 2 is a cross sectional view showing a positional relationship among the plurality of axes of the power transmission device 12. The power transmission device 12 is a transaxle suitably used for a FF hybrid vehicle and installed in the vehicle 10 such that the plurality of axes extend in a lateral (transverse) direction of the vehicle. The power transmission device 12 is stored within a transaxle casing 14 shown in FIG. 2.

The power transmission device 12 has the first through fourth axes S1-S4 that are substantially parallel with the lateral direction of the vehicle. On the first axis S1, an input shat 22 is disposed to be connected to the engine 20. A planetary gear set 24 of a single-pinion type and a first motor-generator MG1 (that corresponds to a first rotary electric machine as one of rotary electric machines) are provided to be coaxial with the first axis S1. The planetary gear set 24 and the first motor-generator MG1 cooperate to constitute an electrically-controlled differential portion 26. The input shaft 22 is connected to a carrier 24c of the planetary gear set 24 as a differential mechanism. The first motor-generator MG1 is connected to a sun gear 24s of the planetary gear set 24. An engine output gear Ge is connected to a ring gear 24r of the planetary gear set 24. The carrier 24c, the sun gear 24s and the ring gear 24r correspond to first, second and third rotary elements of the planetary gear set 24, respectively. The first motor-generator MG1 corresponds to a differential-control rotary machine, and is selectively used as an electric motor or as an electric generator. With a rotating speed of the sun gear 24s being continuously controlled in regenerative control or the like in which the first motor-generator MG1 functions as the electric generator, a rotating speed of a rotary motion transmitted from the engine 20 is continuously changed, and then the rotary motion is outputted through the engine output gear Ge. When a torque of the first motor-generator MG1 is set to 0 to idle the sun gear 24s, the engine 20 is prevented from being dragged to be rotated. The engine 20 is an internal combustion engine configured to generate power by combustion of fuel.

The counter shaft 28, which is disposed on the second axis S2, is provided at its axially opposite end portions with a large-sized reduction gear Gr1 and a small-sized reduction gear Gr2 that cooperate with the counter shaft 28 to constitute a reduction gear device 31. The large-sized reduction gear Gr1 is in mesh with the engine output gear Ge and also with a motor output gear Gm of a second motor-generator MG2 (that corresponds to a second rotary electric machine as another one of rotary electric machines) disposed on the third axis S3. The motor output gear Gm is mounted on a power transmitting shaft 34 that is splined to a rotor shaft 30 of the second motor-generator MG2, such that the power transmitting shaft 34 is unrotatable relative to the rotor shaft 30 about the third axis S3. The second motor-generator MG2 is selectively used as an electric motor or as an electric generator. With the second motor-generator MG2 being subjected to a power-running control to function as the electric motor, the second motor-generator MG2 is used as a drive power source for driving the hybrid vehicle 10.

The small-sized reduction gear Gr2 is in mesh with a differential ring gear Gd of a differential device (differential gear set) 32 disposed on the fourth axis S4, so that driving forces from the engine 20 and the second motor-generator MG2 are distributed to left and right drive shafts 36 via the differential device 32 so as to be transmitted to left and right drive wheels 38. The differential device 32 corresponds to an output portion of the power transmission device 12, while the engine output gear Ge, large-sized reduction gear Gr1, small-sized reduction gear Gr2, motor output gear Gm and differential ring gear Gd cooperate to constitute at least a part of a gear mechanism of the power transmission device 12. As shown in FIG. 2, the fourth axis S4 is located in a position that is lower than positions of the respective first through third axes S1-S3. The positions of the respective second and third axes S2, S3 are located substantially above the position of the fourth axis S4. The position of the first axis S1 is located obliquely above the position of the fourth axis S4, namely, is located on a front upper side of the position of the fourth axis S4. As shown in FIG. 2, in the power transmission device 12, lubricant (e.g., lubricant oil) is stored in a lubricant storage 18 that corresponds to a bottom portion of the transaxle casing 14, and is supplied to, for example, the first motor-generator MG1, the second motor-generator MG2, the planetary gear set 24 and the gear mechanism (that corresponds to a gear train portion), by operations of oil pumps (described below) and rotation of the differential ring gear Gd that scoops up the lubricant from the lubricant storage 18, for thereby cooling and lubricating these elements to which the lubricant is supplied. In the following description, the engine output gear Ge, large-sized reduction gear Gr1, small-sized reduction gear Gr2, motor output gear Gm and differential ring gear Gd, which cooperate to constitute the gear mechanism (i.e., gear train portion), will be collectively referred to as "gears 52" unless otherwise distinguished from each other.

Figures 3, 4:
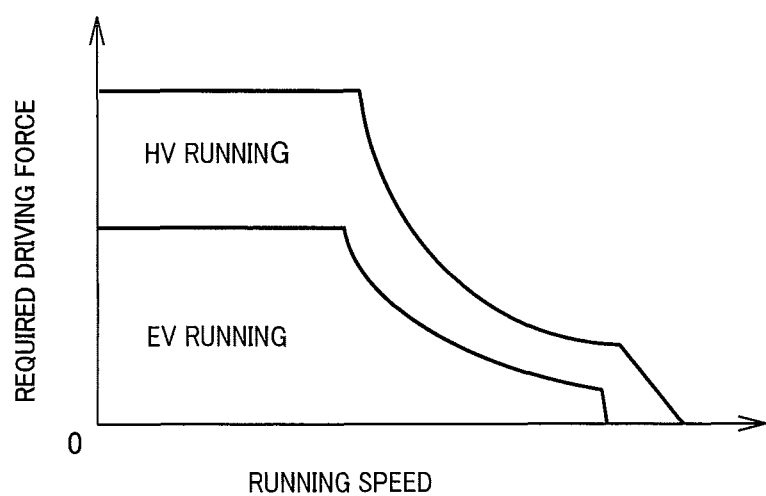
FIG. 3 is a table showing two kinds of drive modes that can be performed by the hybrid vehicle shown in FIG. 1.
FIG. 4 is a map showing, by way of example, regions in which the respective two kinds of drive modes are performed.

In the hybrid vehicle 10 described above, an EV running mode and an HV running mode can be carried out as shown in FIG. 3. For example, as shown in FIG. 4, the running mode is switched between the EV running mode and the HV running mode, in accordance with a mode switching map that is determined using a required driving force (such as an accelerator operation amount) and a vehicle running speed V as parameters. The EV running mode is a mode in which the vehicle runs using the second motor-generator MG2 as the drive power source by power-running controlling the second motor-generator MG2 in a state where the rotation of the engine 20 is stopped, and is selected in a range of low required driving force, i.e. low load. In the EV running mode, for example, supply of fuel to the engine 20 is stopped, and the torque of the first motor-generator MG1 is set to 0 to allow the sun gear 24s of the planetary gear device 24 to be rotated at a certain speed, which allows no rotation of the engine 20 connected with the carrier 24c of the planetary gear device 24 even with the ring gear 24r of the planetary gear device 24 being rotated at a certain speed that is dependent on a running speed V of the vehicle, so that the rotation of the engine 20 is substantially stopped even during running of the vehicle. The HV running mode is a mode in which the vehicle runs using the engine 20 as the drive power source by regeneratively controlling the first motor-generator MG1, and is selected in a range of high required driving force (high load) compared to the EV running mode. In the HV running mode, the second motor-generator MG2 is subjected to the power-running control in an assisting manner, for example, upon acceleration of the vehicle, so as to be used as the drive power source, or is constantly subjected to the power-running control so as to be used as the drive power source.

The above-described power transmission device 12 of the hybrid vehicle 10 is merely an example of a power transmission device that is recited in the appended claims. The power transmission device 12 may be modified as needed. For example, the planetary gear set 24 may be a planetary gear set of double-pinion type, or may be replaced by a plurality of planetary gear sets. Further, the second motor-generator MG2 may be disposed to be coaxial with the first axis S1. Moreover, the electrically-controlled differential portion 26 may be replaced by a mechanically-operated transmission device.

Figure 5:
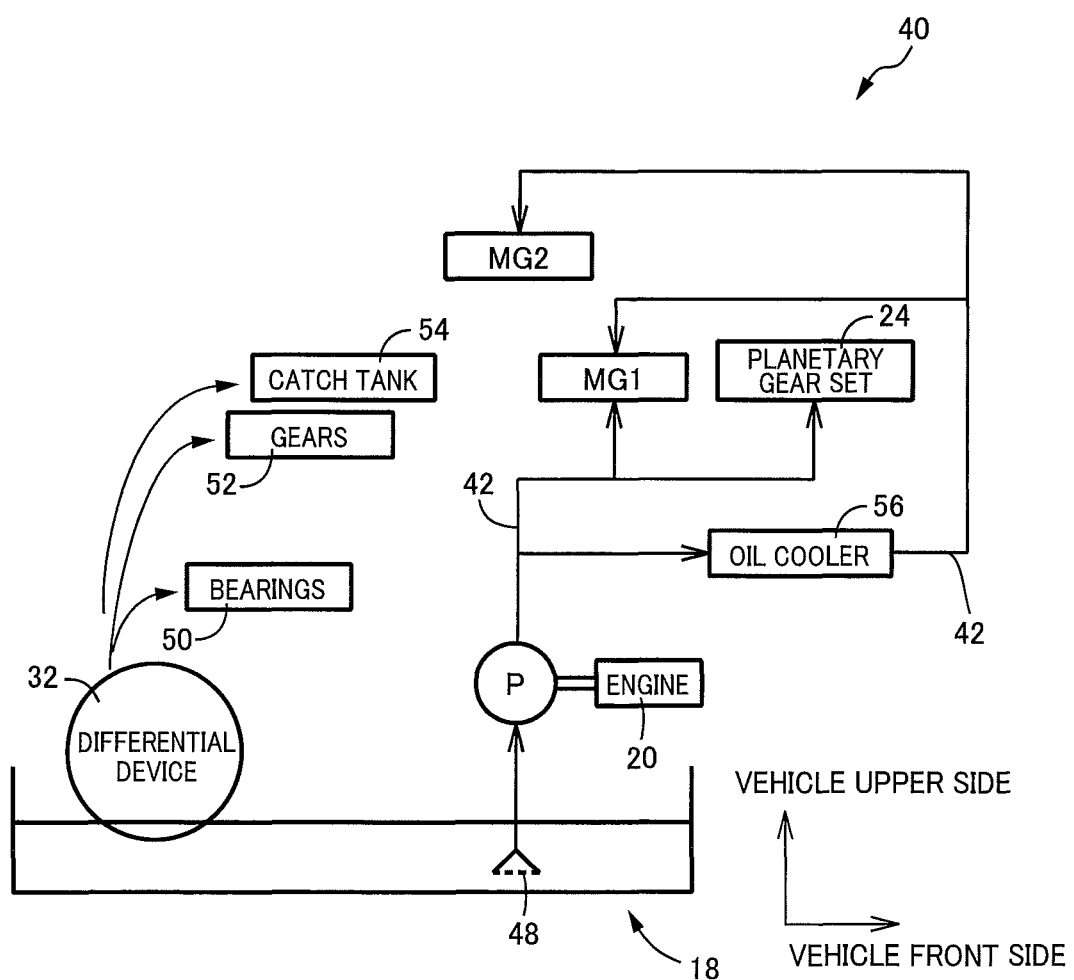
FIG. 5 is a view showing, by way of example, a conventional cooling system provided in a hybrid vehicle.

FIG. 5 is a view showing, by way of example, a conventional cooling system 40 provided in a hybrid vehicle, for lubricating various elements such as gears 52 and bearings 50 and cooling the first and second motor-generators MG1, MG2. The cooling system 40 includes a suction device in the form of a mechanically-operated oil pump P that is mechanically driven by the engine 20, such that the lubricant stored in the lubricant storage 18 is supplied via an inlet port 48 and a passage 42 to the first and second motor-generators MG1, MG2 and the planetary gear set 24. The passage 42 includes a portion that is provided with a heat exchanger in the form an oil cooler 56, such that the lubricant is supplied to the first and second motor-generators MG1, MG2 via the portion provided with the oil cooler 56. The passage 42 further includes a portion that is not provided with the oil cooler 56, such that the lubricant is supplied to the planetary gear set 24 and the first motor-generator MG1 via the portion not provided with the oil cooler 56. The cooling of the first and second motor-generators MG1, MG2 is made by droplets of the lubricant dropping onto them from openings of respective pipes that are located above the first and second motor-generators MG1, MG2. The differential device 32 is partially immersed in the lubricant stored in the lubricant storage 18. Thus, with the lubricant stored in the lubricant storage 18 being scooped or slung up by, for example, the differential ring gear Gd of the differential device 32 during rotations of the drive shafts 36 and the drive wheels 38 that are linked with the differential device 32, the lubricant is supplied to various elements of a power transmission device of the vehicle, namely, to various elements provided inside the power transmission device such as the bearings 50, the gears 52 and a catch tank 54 that provisionally retains the lubricant.

In the above-described conventional cooling system 40, the first and second motor-generators MG1, MG2 are cooled by the lubricant supplied by the mechanically-operated oil pump P that is mechanically driven by the engine 20. Therefore, during EV running of the vehicle in which the second motor-generator MG2 is subjected to the power-running control, the supply of the lubricant is stopped due to stop of the engine 20, so that temperature increase is restrained merely depending on a heat capacity of the second motor-generator MG2. Where there is a need to widen a range of a vehicle running speed in which the EV running is carried out, for example, an electrically-controlled oil pump is additionally provided. However, the additional provision of the electrically-controlled oil pump requires an additional space in which the pump, motor and pipes are to be installed, so that the poor insatiability as well as the additional cost is problematic.

Figure 6:
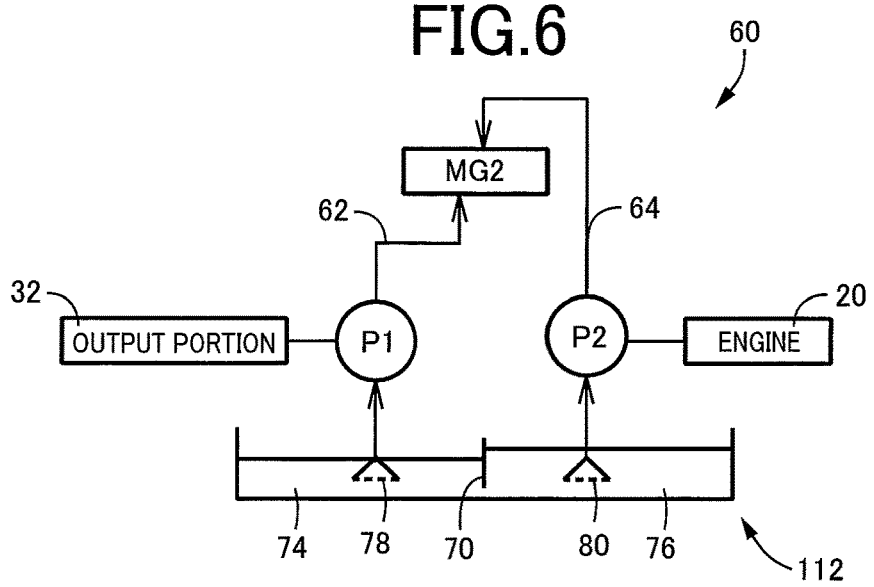
FIG. 6 is a view for explaining, in a simplified manner, a cooling system for a rotary electric machine that is provided in the hybrid vehicle shown in FIG. 1.

FIG. 6 is a diagram for explaining, in a simplified manner, a cooling system 60 constructed according to an embodiment of the invention. In the cooling system 60, the lubricant is supplied to the second motor-generator P2 from two pumps, i.e, a first pump P1 and a second pump P2. The first pump P1 is mechanically driven to be rotated by, for example, the differential ring gear Gd of the differential device 32 that corresponds to the output portion of the power transmission device 12, while the second pump P2 is mechanically driven to be rotated by the engine 20. Thus, the differential device 32, i.e., the output portion of the power transmission device 12 corresponds to a first drive source recited in the appended claims, while the engine 20 corresponds to a second drive source recited in the appended claims. The first pump P1 has an inlet port 78 that is provided in a second lubricant storing portion 74 of a lubricant storage 112, and supplies the lubricant via a first passage 62 to the second motor-generator MG2. The second pump P2 has an inlet port 80 that is provided in a third lubricant storing portion 76 of the lubricant storage 112, and supplies the lubricant via a second passage 64 to the second motor-generator MG2. The lubricant storage 112 is divided, by a partition wall 70, into the second and third lubricant storing portions 74, 76. Each of the inlet ports 78, 80 is located in a corresponding one of the second and third lubricant storing portions 74, 76, so that an amount of ejection or suction of the lubricant made by each of the first and second pumps P1, P2 can be set depending on an amount of the lubricant returned into a corresponding one of the second and third lubricant storing portions 74, 76. As shown in FIG. 6, the partition wall 70 has, in its lower end portion, an opening that functions as an orifice passage. However, the provision of the opening is not essential, because, when the lubricant is returned to one of the two lubricant storing portions 74, 76 much more than to the other, the lubricant overflowing in the one of the two lubricant storing portions 74, 76 may pass over the partition wall 70 so as to be supplied to the other of the two lubricant storing portions 74, 76.

Figure 7:
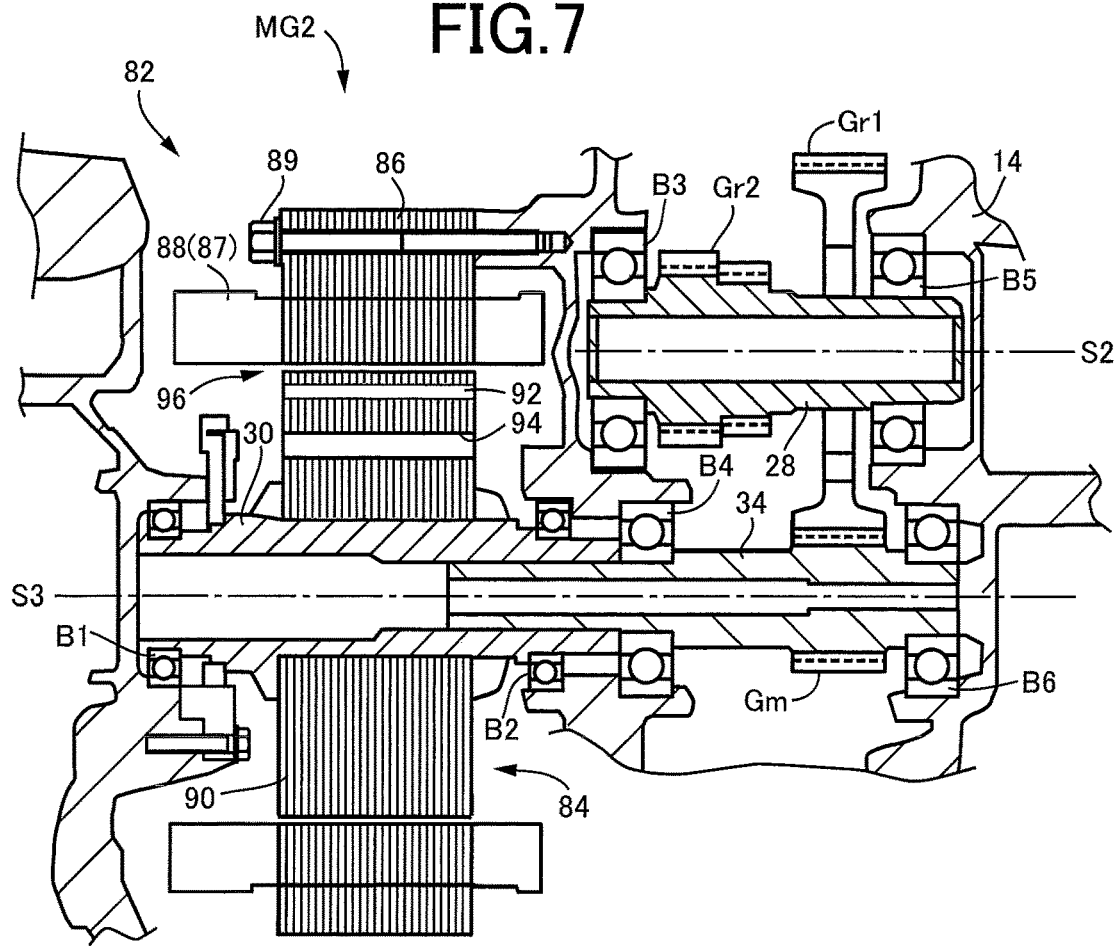
FIG. 7 is a view showing, by way of example, a construction of the rotary electric machine shown in FIG. 6.

As shown in FIG. 7, the second motor-generator MG2, the rotor shaft 30 of the second motor-generator MG2 and the power transmitting shaft 34, which has the motor output gear Gm and is splined to the rotor shaft 30, are disposed on the third axis S3. The counter shaft 28, which is disposed on the second axis S2, has the large-sized reduction gear Gr1 and the small-sized reduction gear Gr2, such that the large-sized reduction gear Gr1 is in mesh with the motor output gear Gm of the power transmitting shaft 34. The rotor shaft 30 is freely rotatably held by bearings B1, B2, the power transmitting shaft 34 is freely rotatably held by bearings B4, B6, and the counter shaft 28 is freely rotatably held by bearings B3, B5. The bearings B1, B2, B3, B4, B5, B6 are held in the transaxle casing 14. The second motor-generator MG2 includes a cylindrical-shaped stator 82 which is fixed in the transaxle casing 14 by means of bolts 89, and a rotor 84 which is fixedly mounted on the rotor shaft 30 and which is located radially inside the stator 82, with an annular clearance or gap (air gap) 96 between the stator 82 and the rotor 84. The stator 82 includes a stator core 86, which is constituted by, for example, electromagnetic steel sheets superposed on each other, and which is fixed in the transaxle casing 14 by means of the bolts 89, such that the stator core 86 is unrotatable relative to the transaxle casing 14. A coil 87, which is covered with an insulating coating made of, for example, polyimide, is introduced inside the stator 82. On opposite sides of the stator core 86 in a direction of the third axis S3, coil ends 88, which are constituted by windings of the coil 87, are provided. The cooling of the stator 82 is made mainly by supply of the lubricant to the coil ends 88. The rotor 84 is constituted by a cylindrical-shaped rotor core 90 consisting of, for example, electromagnetic steel sheets superposed on each other. The rotor 84 is fixed at its inner circumferential portion on the rotor shaft 30, so as to be rotatable about the third axis S3 together with the rotor shaft 30. At least one permanent magnet 92 is provided in a radially outer portion of the rotor core 90. At least one cooling hole 94 is provided in a radially intermediate portion of the rotor core 90, so as to cool the rotor core 90.

Figure 8:
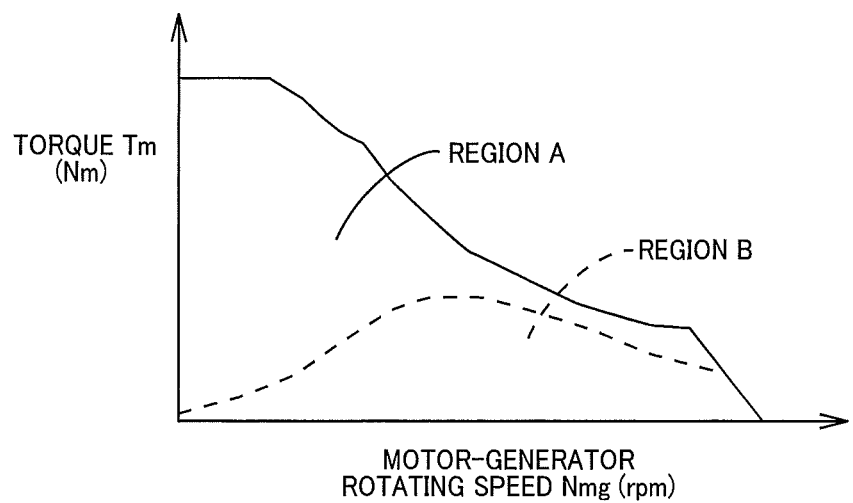
FIG. 8 is a view for explaining that a heat generated part of the rotary electric machine shown in FIG. 7 is changed depending on a rotating speed and a torque of the rotary electric machine.

FIG. 8 shows an example of relationship between a rotating speed Nmg (rpm) of the motor-generators MG1, MG2 and a torque Tm (Nm) outputted from the first and second motor-generators MG1, MG2. It is noted that, since the second motor-generator MG2 is used as the drive power source to be subjected to the power-running control in the EV running of the hybrid vehicle 10 in the present embodiment, the second motor-generator MG2 in place of the first and second motor-generators MG1, MG2 will be referred as the drive power source in the following description relating to the present embodiment. In FIG. 8, solid line represents an allowable output torque Tm of the second motor-generator MG2, in relation with a rotating speed Nmg of the second motor-generator MG2. In FIG. 8, a left-side region (in which the rotating speed Nmg is low) corresponds to a low-speed running which is performed, for example, in an urban area, and in which a required torque is high. Meanwhile, a right-side region (in which the rotating speed Nmg is high) corresponds to a high speed running in which a required torque is low. It is noted that the rotating speed Nmg of the second motor-generator MG2 is measured by a known device such as a resolver. FIG. 8 implies that region B defined by broken line and region A defined by solid line and broken line differ from each other in terms of a main heat source within the second motor-generator MG2, namely, a part of the second motor-generator MG2, which corresponds to the main hear source, varies depending on which one of the region A and the region B an operational state of the second motor-generator MG2 corresponds to. The region A represents a region in which copper loss is high, namely, heat generation in the coil 87 of the stator 82 is larger than heat generation in the rotor core 90 of the rotor 84. The region B represents a region in which iron loss (core loss) is high, namely, the heat generation in the rotor core 90 of the rotor 84 is larger than the heat generation in the coil 87 of the stator 82.

Figure 9:
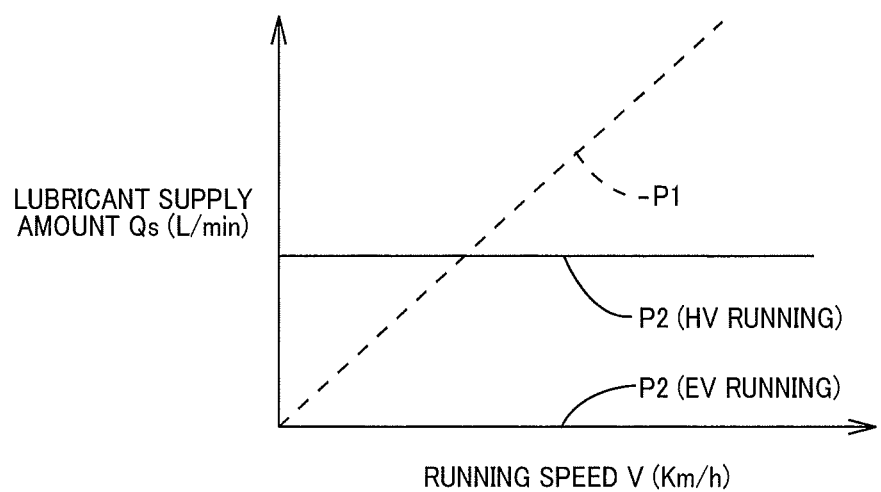
FIG. 9 is a view for explaining an amount of lubricant supplied from each of two pumps in the hybrid vehicle shown in FIG. 1, in relation with a running speed of the vehicle.

FIG. 9 shows a relationship between a vehicle running speed V (km/h) and an amount Qs (L/min) of the lubricant supplied to the second motor-generator MG2 from each of the first and second pumps P1, P2 of the cooling system 60 shown in FIG. 6. The first pump P1 is mechanically driven through a pump driving gear Gp (see FIG. 1) that is in mesh with the differential ring gear Gd of the differential device 32, so that the amount Qs (represented by broken line) of the lubricant supplied to the second motor-generator MG2 from the first pump P1 is increased in proportion with the vehicle running speed V. The second pump P2 is driven by the engine 20, so that the amount Qs (represented by solid line) of the lubricant supplied to the second motor-generator MG2 from the second pump P2 is constant unless the rotating speed of the engine 20 is changed during the HV running, and is zero during the EV running in which the engine 20 is stopped.

Figure 10:
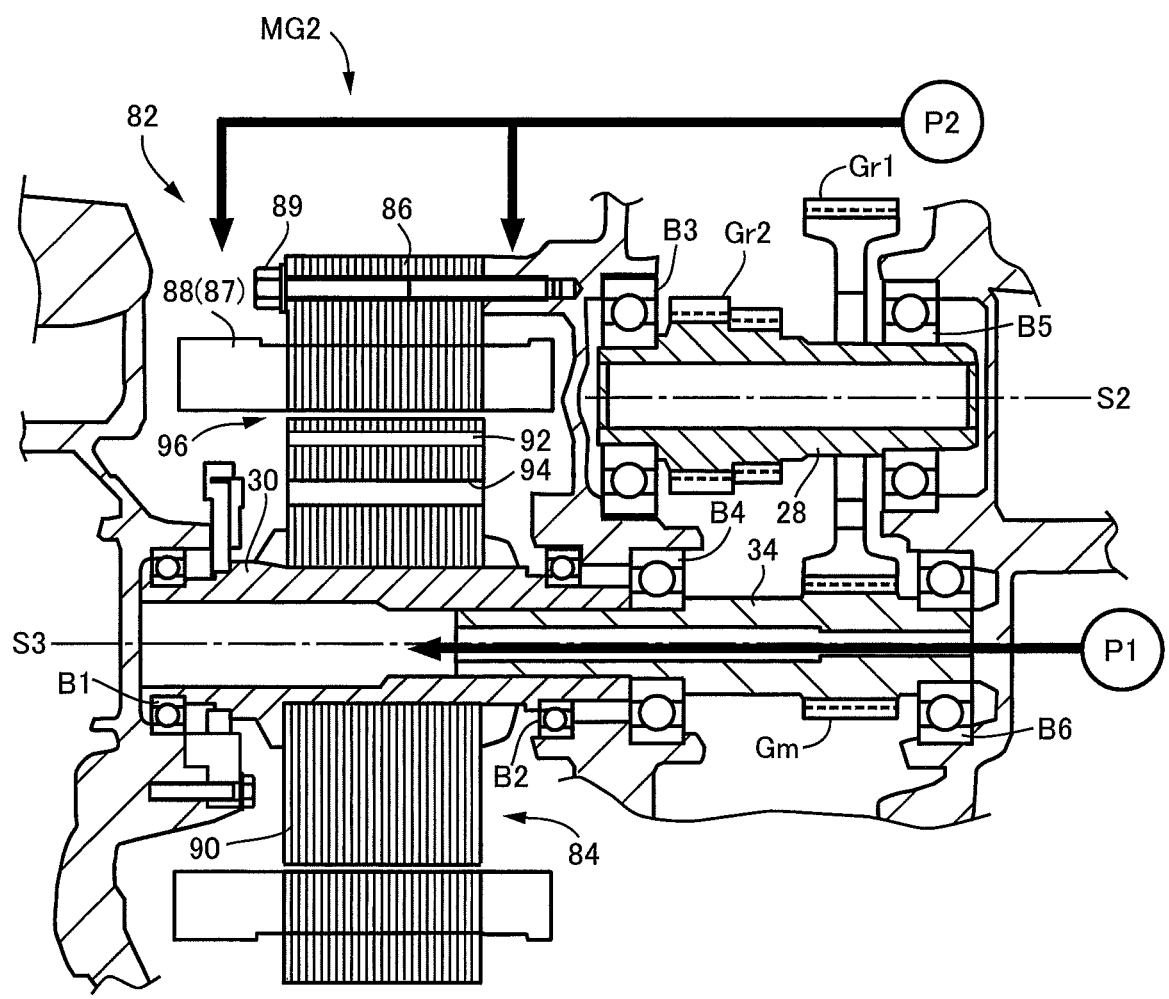
FIG. 10 is a view showing a passage through which the lubricant is supplied from each of the above-described two pumps to the rotary electric machine.

FIG. 10 shows parts of the second motor-generator MG2 to which the lubricant is supplied from the first and second pumps P1, P2. The lubricant ejected by the first pump P1 is supplied through the first passage 62 to an inside of the rotator shaft 30 on which the rotor core 90 is fixedly mounted. The lubricant ejected by the second pump P2 is supplied through the second passage 64, onto an outer circumferential surface of the stator 82, particularly, the coil ends 88 of the coil 87 as a heat generation source, for example, from openings of respective cooling pipes (not shown) which are located above the coil ends 88, such that droplets of the lubricant are caused to drop from the openings onto outer circumferential surfaces of the coil ends 88. If the cooling of the rotor core 90 were intended by the droplets of the lubricant caused to drop onto the coil ends 88 of the stator 82, namely, if the rotor core 90 were intended to be cooled through the stator 82, the rotor core 90 would not be satisfactorily cooled because the above-described air gap 96 that is an annular gap between the stator core 86 and the rotor core 90 could serve as a heat-insulating layer that impedes thermal conduction between the two cores 86, 90 whereby the cooling efficiency could be restrained. In the present embodiment, owing to the above-described arrangement, when the EV running is carried out with the rotating speed Nmg of the second motor-generator MG2 being high, namely, when the operational state of the second motor-generator MG2 corresponds to the region B shown in FIG. 8 in which the heat generation in the rotor core 90 of the rotor 84 is likely to be larger than the heat generation in the coil 87 of the stator 82, the amount Qs of supply of the lubricant from the first pump P1 is increased with increase of the vehicle running speed V that corresponds to increase of the rotating speed Nmg of the second motor-generator MG2, so that the amount of the lubricant supplied for cooling the rotor core 90 is increased whereby the rotor core 90 is effectively cooled. Further, owing to the above-described arrangement, when the HV running is carried out with the rotating speed Nmg of the second motor-generator MG2 being low and with the torque Tm of the second motor-generator MG2 being high, namely, when the operational state of the second motor-generator MG2 corresponds to the region A shown in FIG. 8, the cooling is made by droplets of the lubricant supplied from the second pump P2, which are caused to drop from an upper side of the outer circumferential surface of each of the coil ends 88 of the coil 87, whereby the coil ends 88 in which the heat generation is high is effectively cooled.

In the present embodiment, the cooling system 60 includes: the first pump P1 which is to be mechanically driven accompanying with running of the vehicle 10, to supply lubricant to the second motor-generator MG2 (provided in the vehicle 10 for driving the vehicle 10); and the second pump P2 which is to be driven by the engine 20 as the second drive source that is other than the first drive source of the first pump P1, to supply the lubricant to the second motor-generator MG2, wherein the first pump P1 is configured to supply the lubricant, through the first passage 62, to the inside of the rotor shaft 30 that is the rotary shaft of the rotor core 90 of the second motor-generator MG2, and the second pump P2 is configured to supply the lubricant, through the second passage 64, to the coil 87 of the stator 82 of the second motor-generator MG2. When the vehicle running speed V, i.e., the rotating speed Nmg of the second motor-generator MG2 is high with the required torque being low, the amount of heat generated in the rotor core 90 is increased while the amount of heat generated in the coil 87 of the stator 82 is not so increased. In the cooling system 60 constructed described above, the amount Qs of the lubricant supplied from the first pump P1 to the rotor core 90 is increased with increase of the running speed V, so that it is possible to widen a range in which the second motor-generator MG2 is used to drive the vehicle 10 and also to control the amount of the lubricant supplied from each of the first and second pumps P1, P2 appropriately depending on change of a heat generation part of the second motor-generator MG2 in which heat is generated.

Further, the first pump P1 is an oil pump that is to be mechanically driven by the first drive source in the form of the differential device 32 configured to rotate the drive shafts 36 of the respective drive wheels 38. Thus, when the vehicle running speed V is high, namely, when heat generated in the rotor core 90 of the second motor-generator MG2 is increased with increase of the rotating speed Nmg of the rotor core 90, an amount of the lubricant supplied to the inside of the rotor shaft 30 of the rotor core 90 is increased whereby the heat generation part of the second motor-generator MG2 can be appropriately cooled.

Further, the second pump P2 is an oil pump that is to be mechanically driven by the second drive source in the form of the engine 20. Thus, during the HV running with the vehicle running speed V being low and with a required output torque of the second motor-generator MG2 being high, namely, when an amount of heat generated in the coil 87 of the stator 82 of the second motor-generator MG2 is increased, the lubricant is supplied to the coil 87 of the stator 82 whereby the heat generation part of the second motor-generator MG2 can be appropriately cooled.

There will be described another embodiment of this invention. The same reference signs as used in the above-described first embodiment will be used in the following embodiment, to identify the functionally corresponding elements, and descriptions thereof are not provided.

Second Embodiment

Figure 11:
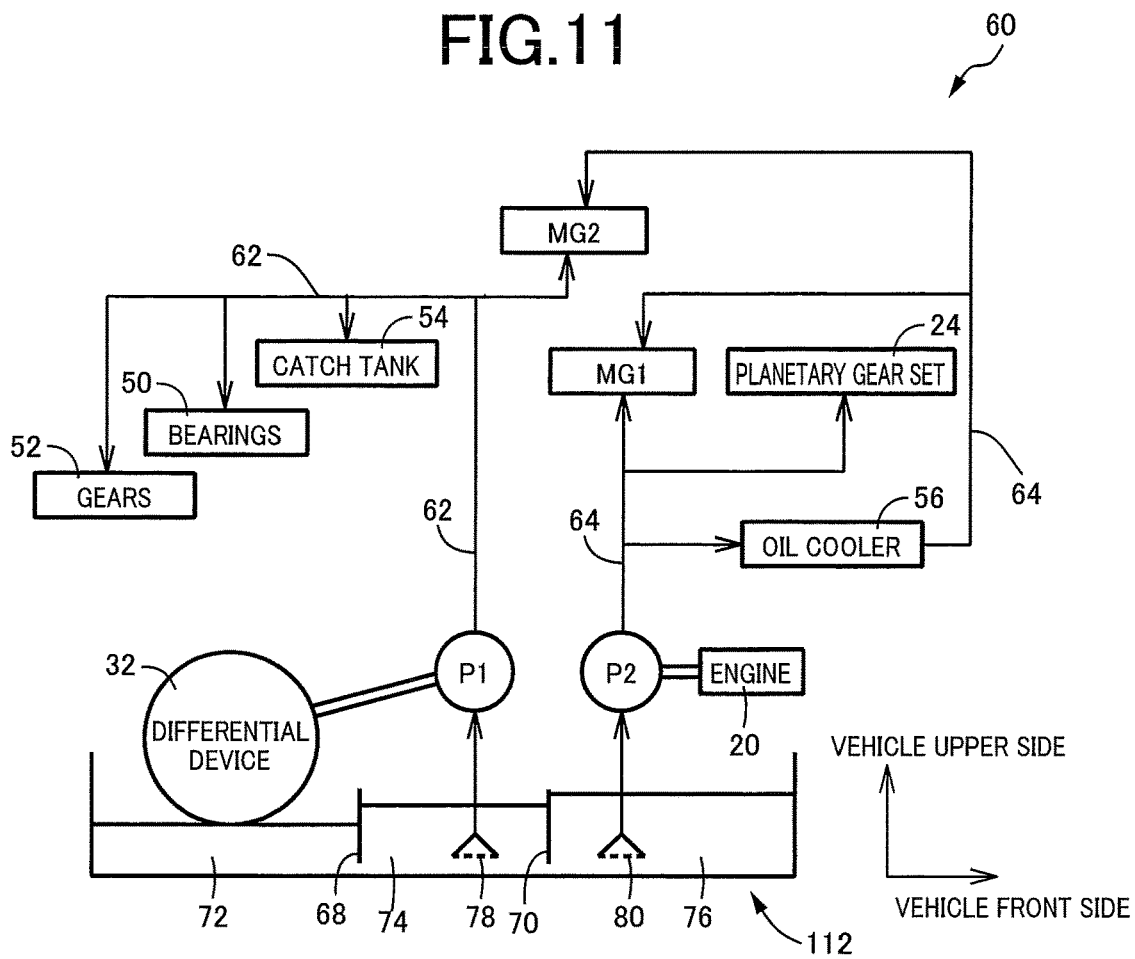
FIG. 11 is a view showing, by way of example, a cooling system that is advantageously provided in the hybrid vehicle shown in FIG. 1.

FIG. 11 shows a diagram of the cooling system 60 constructed according to a second embodiment of the invention. FIG. 11 is similar to FIG. 6, but is different from FIG. 6 in that the oil cooler 56, planetary gear set 24 and bearings 50 are additionally illustrated therein, so as to be more detailed than FIG. 6. The lubricant storage 112, which corresponds to a bottom portion of the transaxle casing 14, is divided, by first and second partition walls 68, 70, into first, second and third lubricant storing portions 72, 74, 76. The differential device 32 is partially immersed in the lubricant stored in the first lubricant storing portion 72 of the lubricant storage 112. The first pump P1, which is mechanically driven by the differential device 32, is connected through an inlet passage to the inlet port 78 that is disposed in the second lubricant storing portion 74 that is defined between the first and second partition walls 68, 70. The second pump P2, which is mechanically driven by the engine 20, is connected through an inlet passage to the inlet port 80 that is disposed in the third lubricant storing portion 76 that is defined by the second partition wall 70. Thus, the lubricant storage 112 is divided, by the two partition walls 68, 70, into the three lubricant storing portions 72, 74, 76, and the two inlet ports for the respective two pumps P1, P2 are disposed in the respective second and third lubricant storing portions 74, 76, so that an amount of ejection or suction of the lubricant made by each of the first and second pumps P1, P2 can be set depending on an amount of the lubricant returned into a corresponding one of the second and third lubricant storing portions 74, 76. As shown in FIG. 11, each of the first and second partition walls 68, 70 has, in its lower end portion, an opening that functions as an orifice passage. However, the provision of the opening is not essential, because, when the lubricant is returned to one of the three lubricant storing portions 72, 74, 76 much more than to the others, the lubricant overflowing in the one of the three lubricant storing portions 72, 74, 76 may pass over a corresponding one of the partition walls 68, 70 so as to be supplied to the others.

The first passage 62 is connected to an outlet port of the first pump P1, such that the lubricant is supplied from the first pump P1 through the first passage 62 to the second motor-generator MG2 and also various elements of the power transmission device 12 such as the bearings 50 (bearings B1, B2, B3, B4, B5, B6, etc.), the gears 52 (gears Ge, Gr1, Gr2, Gd, Gm, Gp, etc.) and the catch tank 54. The second passage 64 is connected to an outlet port of the second pump P2, such that the lubricant is supplied from the second pump P2 through the second passage 64 to the planetary gear set 24 of the power transmission device 12, the first motor-generator MG1 and also the oil cooler 56. The second passage 64 includes a portion that communicates between the oil cooler 56 and the first motor-generator MG1 and a portion that communicates between the oil cooler 56 and the second motor-generator MG2, such that the lubricant cooled by the oil cooler 56 is supplied to the first and second motor-generators MG1, MG2. It is noted that the lubricant stored in the in the first lubricant storing portion 72 may be scooped or slung up by at least one of the gears of the differential device 132, so as to be supplied to the elements such as the bearings 50, gears 52 and catch tank 54.

In this second embodiment, the second passage 64, through which the lubricant is to be supplied from the second pump P2 to the coil 87 of the stator 82 of the second motor-generator MG2, is provided with the oil cooler 56, while the first passage 62 is provided without the oil cooler 56. When the lubricant is supplied through the first passage 62 from the first pump P1 that is mechanically driven accompanying with running of the hybrid vehicle 10, with the supply of the lubricant from the second pump P2 being stopped, at a low temperature at which a viscosity of the lubricant is high, a mechanical loss that could be caused due to the high viscosity of the lubricant can be restrained owing to the arrangement in which the first passage 62 is provided without the oil cooler 56 whereby the lubricant can be rapidly warmed. Thus, in the present second embodiment, this technical advantage, in addition to the technical advantage provided in the above-described first embodiment, is provided.

Further, in this second embodiment, the first pump P1 is configured to supply the lubricant through the first passage 62 to also the gears 52 (gears Ge, Gr1, Gr2, Gd, Gm, Gp, etc.) that are connected to the differential device 32 in the power transmission device 12. Thus, the cooling of the second motor-generator MG2 and the lubrication of the gears 52 can be made by a single pump in the form of the first pump P1, whereby the vehicle can be made compact in size.

There will be described still another embodiment of this invention. The same reference signs as used in the above-described embodiments will be used in the following embodiment, to identify the functionally corresponding elements, and descriptions thereof are not provided.

Third Embodiment

Figure 12:
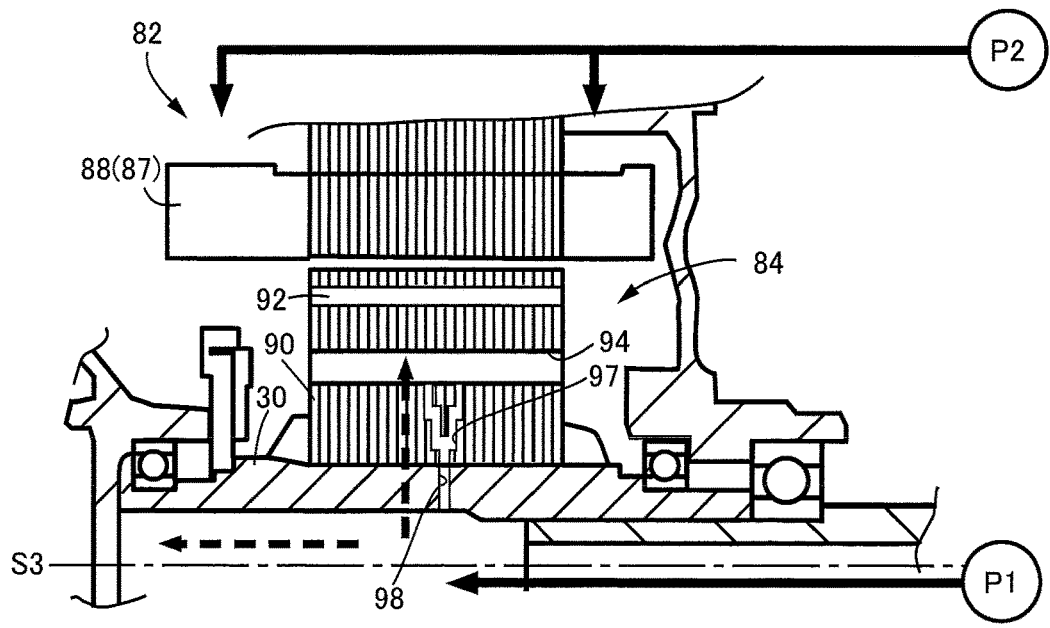
FIG. 12 is a view showing holes through which the lubricant is delivered from an inside of a rotary shaft of a rotor core to the rotor core in the rotary electric machine shown in FIG. 10.

FIG. 12 shows lubricant holes in the form of at least one oil hole 97 and at least one oil hole 98 through which the lubricant is delivered from the inside of the rotor shaft 30 to an internal portion the rotor core 90 in the second motor-generator MG2. That is, in this third embodiment, the lubricant supplied from the first pump P1 cools not only the rotor core 90 via the rotor shaft 30 but also directly an inside of the rotor core 90. Specifically described, this third embodiment is different from the above-described embodiments in that the at least one oil hole 98 is provided in an outer circumferential surface of the rotor shaft 30 to open in the inside of the rotor shaft 30, and the at least one oil hole 97 is provided in an inner circumferential surface of the rotor core 90 to communicate between the at least one oil hole 98 and the at least one cooling hole 94 of the rotor core 90. Thus, the first passage 62 includes the at least one oil hole 97 and the at least one oil hole 98 that communicates between the inside of the rotor shaft 30 and the internal portion of the rotor core 90, such that the lubricant supplied to the inside of the rotor shaft 30 is caused to flow from the inside of the rotor shaft 30 to the internal portion of the rotor core 90. Thus, the lubricant supplied by operation of the first pump P1 is caused to flow into the internal portion of the rotor core 90 of the second motor-generator MG2, whereby the cooling of the rotor core 90 of the second motor-generator MG2 is more effectively made.

There will be described still another embodiment of this invention. The same reference signs as used in the above-described embodiments will be used in the following embodiment, to identify the functionally corresponding elements, and descriptions thereof are not provided.

Fourth Embodiment

Figure 13:
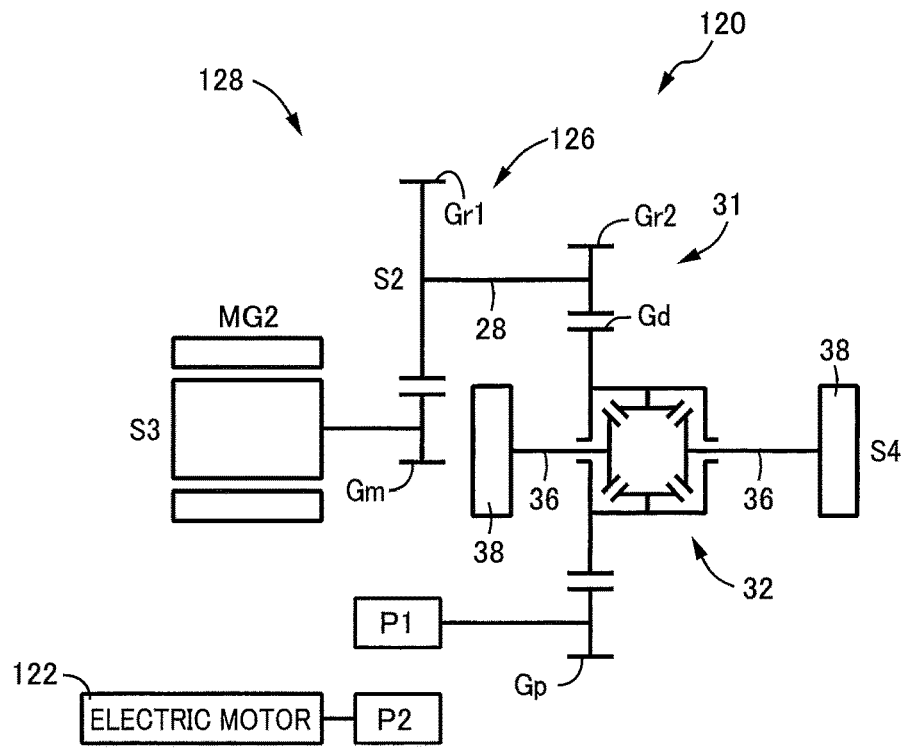
FIG. 13 is a schematic view showing a power transmission device of another vehicle to which the present invention is advantageously applied.

FIG. 13 shows, by way of example, a power transmission device 128 of an electric vehicle 120 having, as the drive power source for driving the vehicle 120, only the second motor-generator MG2 without the engine 20. This fourth embodiment is different from the above-described first embodiment in that the vehicle 120 does not include the engine 20 and the electrically-controlled differential portion 26 (that is constituted mainly by the first motor-generator MG1 and the planetary gear set 24), which are included in the vehicle 120 in the first embodiment, so that the second pump P2 is an electrically-controlled oil pump that is to be driven by an electric motor 122 exclusively serving to drive the pump P2, rather than being a mechanically-operated oil pump driven by an engine. Thus, in this fourth embodiment, the electric motor 122 corresponds to the second drive source recited in the appended claims.

Figure 14:
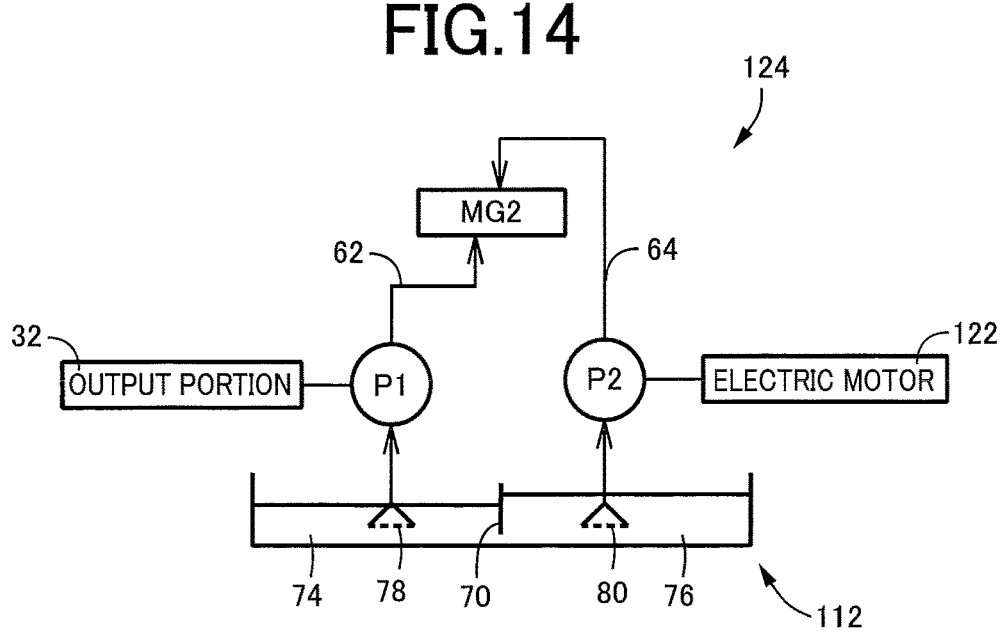
FIG. 14 is a view for explaining, in a simplified manner, a cooling system for a rotary electric machine that is provided in the vehicle shown in FIG. 13.

FIG. 14 shows a cooling system 124 constructed according to the this fourth embodiment. The cooling system 124 is different from the cooling system 60 of the above-described first embodiment shown in FIG. 6 in that the drive source of the second pump P2 is constituted by the electric motor 122 in place of an engine.

In this fourth embodiment, the cooling system 124 includes: the first pump P1 which is to be mechanically driven accompanying with running of the vehicle 120, to supply lubricant to the second motor-generator MG2 (provided in the vehicle 120 for driving the vehicle 120); and the second pump P2 which is to be driven by the electric motor 122 as the second drive source that is other than the first drive source of the first pump P1, to supply the lubricant to the second motor-generator MG2, wherein the first pump P1 is configured to supply the lubricant, through the first passage 62, to the inside of the rotor shaft 30 that is the rotary shaft of the rotor core 90 of the second motor-generator MG2, and the second pump P2 is configured to supply the lubricant, through the second passage 64, to the coil 87 of the stator 82 of the second motor-generator MG2. Owing to this construction, it is possible to control the amount of the lubricant supplied from each of the first and second pumps P1, P2 appropriately depending on change of a part of the second motor-generator MG2 in which heat is generated.

In this fourth embodiment, the arrangements employed in the above-described second and third embodiments can be employed so that substantially the same technical advantages can be provided. For example, the second passage 64, through which the lubricant is to be supplied from the second pump P2 to the coil 87 of the stator 82 of the second motor-generator MG2, may be provided with the oil cooler 56, while the first passage 62 may be provided without the oil cooler 56. When the lubricant is supplied through the first passage 62 from the first pump P1 that is mechanically driven accompanying with running of the vehicle 120, with the supply of the lubricant from the second pump P2 being stopped, at a low temperature at which a viscosity of the lubricant is high, a mechanical loss that could be caused due to the high viscosity of the lubricant can be restrained owing to the arrangement in which the first passage 62 is provided without the oil cooler 56 whereby the lubricant can be rapidly warmed. Thus, in this fourth embodiment, too, this technical advantage, in addition to the technical advantage provided in the above-described first embodiment, may be provided.

Further, in this fourth embodiment, too, the first pump P1 may be configured to supply the lubricant through the first passage 62 to also gears 126 (gears Ge, Gr1, Gr2, Gd, Gm, Gp, etc.) that are connected to the differential device 32 in the power transmission device 128. Thus, the cooling of the second motor-generator MG2 and the lubrication of the gears 126 can be made by a single pump in the form of the first pump P1, whereby the vehicle can be made compact in size.

Moreover, in this fourth embodiment, too, it is possible to employ the arrangement of the above-described third embodiment shown in FIG. 12 in which the at least one oil hole 97 and the at least one oil hole 98 are provided so that the lubricant supplied from the first pump P1 cools not only the rotor core 90 via the rotor shaft 30 but also directly the inside of the rotor core 90. Owing to this arrangement, the lubricant supplied by operation of the first pump P1 is caused to flow into the internal portion of the rotor core 90 of the second motor-generator MG2, whereby the cooling of the rotor core 90 of the second motor-generator MG2 is more effectively made.

In the above-described embodiments, the first pump P1 is driven by the differential ring gear Gd of the differential device 32. However, the first pump P1 may be driven by any one of the other gears such as the small-sized reduction gear Gr2 of the counter shaft 28.

It is to be understood that the embodiments described above are given for illustrative purpose only, and that the present invention may be embodied with various modifications and improvements which may occur to those skilled in the art.

NOMENCLATURE OF ELEMENTS

10, 120: vehicle
20: engine (drive power source)
30: rotor shaft (rotary shaft)
32: differential device (output portion)
36: drive shafts
38: drive wheels
40, 60, 124: cooling system
52, 126: gears (gear train portion)
56: oil cooler (heat exchanger)

62, 64: first passage, second passage
82: stator
88: coil ends (coil)
90: rotor core
97, 98: oil holes
122: electric motor
MG1, MG2: first motor-generator, second motor-generator (rotary electric machine)
P1, P2: first pump, second pump

What is claimed is:

1. A cooling system for a rotary electric machine which is provided in a vehicle for driving the vehicle,
said cooling system comprising:
a first pump which is to be mechanically driven accompanying with running of the vehicle, to supply lubricant to the rotary electric machine; and
a second pump which is to be driven by a second drive source that is other than a first drive source of said first pump, to supply the lubricant to the rotary electric machine, wherein
said first pump is configured to supply the lubricant, through a first passage, to an inside of a rotary shaft of a rotor core of the rotary electric machine, and
said second pump is configured to supply the lubricant, through a second passage, to a coil of a stator of the rotary electric machine.

2. The cooling system according to claim 1, wherein the vehicle includes a power transmission device configured to transmit a drive force for driving drive wheels of the vehicle,
the power transmission device includes an output portion through which the drive force is outputted from the power transmission device, and
said first pump is an oil pump that is to be mechanically driven by the first drive source that is constituted by the output portion configured to rotate drive shafts of respective drive wheels of the vehicle.

3. The cooling system according to claim 1, wherein said second pump is an oil pump that is to be mechanically driven by an engine of the vehicle as the second drive source.

4. The cooling system according to claim 1, wherein said second passage, through which the lubricant is to be supplied from said second pump to the coil of the stator of the rotary electric machine, is provided with a heat exchanger, while said first passage is provided without a heat exchanger.

5. The cooling device according to claim 1, wherein said first passage includes a lubricant hole that communicates between the inside of the rotary shaft and an internal portion of the rotor core, such that the lubricant supplied to the inside of the rotary shaft is caused to flow from the inside of the rotary shaft to the internal portion of the rotor core via said lubricant hole.

6. The cooling device according to claim 1, wherein said first pump is configured to supply the lubricant through said first passage to a gear train portion connected to an output portion that is configured to rotate drive shafts of respective drive wheels of the vehicle.

7. The cooling device according to claim 1, wherein said second pump is an oil pump that is to be mechanically driven by an electric motor as the second drive source.

* * * * *